US011373352B1

(12) United States Patent
Gafni et al.

(10) Patent No.: US 11,373,352 B1
(45) Date of Patent: Jun. 28, 2022

(54) MOTION TRANSFER USING MACHINE-LEARNING MODELS

(71) Applicant: Meta Platforms, Inc., Menlo Park, CA (US)

(72) Inventors: Oran Gafni, Ramat Gan (IL); Oron Ashual, Tel Aviv (IL); Lior Wolf, Herzliya (IL)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/192,092

(22) Filed: Mar. 4, 2021

(51) Int. Cl.
*G06T 11/60* (2006.01)
*G06T 7/11* (2017.01)
*G06T 13/00* (2011.01)
*G06T 7/149* (2017.01)

(52) U.S. Cl.
CPC ............... *G06T 11/60* (2013.01); *G06T 7/11* (2017.01); *G06T 7/149* (2017.01); *G06T 13/00* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 10,321,728 | B1 * | 6/2019 | Koh | G06T 11/203 |
|---|---|---|---|---|
| 11,074,711 | B1 * | 7/2021 | Akbas | G06T 7/73 |
| 2019/0371080 | A1 * | 12/2019 | Sminchisescu | G06K 9/6256 |
| 2020/0118149 | A1 * | 4/2020 | Gandhi | G06Q 30/0206 |
| 2020/0193591 | A1 * | 6/2020 | Kamiyama | G06T 7/75 |
| 2020/0193614 | A1 * | 6/2020 | Tadi | G06N 5/003 |
| 2020/0312037 | A1 * | 10/2020 | Kopeinigg | G06T 17/205 |
| 2021/0049468 | A1 * | 2/2021 | Karras | G06N 3/0454 |
| 2021/0049811 | A1 * | 2/2021 | Fedyukov | G06T 17/00 |
| 2021/0232806 | A1 * | 7/2021 | He | G06K 9/6271 |
| 2021/0271919 | A1 * | 9/2021 | Yang | G06K 9/4604 |
| 2021/0279515 | A1 * | 9/2021 | Zhang | G06K 9/6215 |
| 2021/0335004 | A1 * | 10/2021 | Zohar | G06T 7/74 |

OTHER PUBLICATIONS

Jha, "Implementing SPADE using fastai", https://towardsdatascience.com/implementing-spade-using-fastai-6ad86b94030a, May 10, 2019.*

(Continued)

*Primary Examiner* — Jeffrey J Chow
(74) *Attorney, Agent, or Firm* — Baker Botts L.L.P.

(57) ABSTRACT

In one embodiment, a method includes generating a keypoint pose and a dense pose for a first person in a first pose based on a first image comprising the first person in the first pose, generating an input semantic segmentation map corresponding to a second person in a second pose based on a second image comprising the second person in the second pose, generating a target semantic segmentation map corresponding to the second person in the first pose by processing the keypoint pose, the dense pose, and the input segmentation map using a first machine-learning model, generating an encoding vector representing the second person based on the second image, and generating a target image of the second person in the first pose by processing the encoding vector and the target segmentation map using a second machine-learning model.

19 Claims, 7 Drawing Sheets

(56) References Cited

OTHER PUBLICATIONS

Tanugraha, "Understanding OpenPose (with code reference)—Part 1", https://medium.com/analytics-vidhya/understanding-openpose-with-code-reference-part-1-b515ba0bbc73, Sep. 13, 2019.*

Li et al, "Convolutional Neural Network-Based Block Up-Sampling for Intra Frame Coding", https://arxiv.org/pdf/1702.06728.pdf, Jul. 14, 2017.*

Cao, et al., VGGFace2: A Dataset for Recognising Faces Across Pose and Age, arXiv preprint arXiv:1710.08092v2, 11 pages, May 13, 2018.

Cao, et al., OpenPose: Realtime Multi-Person 2d Pose Estimation Using Part Affinity Fields, In arXiv preprint arXiv:1812.08008V2, 14 pages, May 30, 2019.

Chan, et al., Everybody Dance Now. arXiv preprint arXiv:1808.07371V1, 9 pages, Aug. 22, 2018.

Chao, et al., Generative Models for Pose Transfer, ArXiv preprint arxiv:1806.09070V1, 8 pages, Jun. 24, 2018.

Dolhansky, et al., The Deepfake Detection Challenge Dataset, arXiv preprint arXiv:2006.07397v4, 13 pages, Oct. 28, 2020.

Dong, et al., Soft-Gated Warping-Gan for Pose-Guided Person Image Synthesis, $32^{nd}$ Conference on Neural Information Processing Systems, Montreal Canada, 11pages, 2018.

Esser, et al., Towards Learning A Realistic Rendering of Human Behavior, In ECCV Workshop, 17 pages, 2018.

Figurnov, et al., PerforatedCNNs: Acceleration Through Elimination of Redundant Convolutions, in $30^{th}$ Conference on Neural Information Processing Systems, 9 pages, 2016.

Gafni, et al., Wish You Were Here: Context-Aware Human Generation, In Proceedings of the IEEE/CVF Conference on Computer Vision and Pattern Recognition, pp. 7840-7849, 2020.

Gafni, et al., Vid2game: Controllable Characters Extracted from Real-World Videos, arXiv preprint arXiv: 1904.08379V1, 14 pages, Apr. 17, 2019.

Gafni, et al., Single-Shot Freestyle Dance Reenactment, arxiv:2012.01158v1, 14 pages, Dec. 2, 2020.

Gong, et al., Instance-Level Human Parsing Via Part Grouping Network, in Proceedings of the European Conference on Computer Vision (ECCV), 16 pages, 2018.

Guler, et al., Dense-Pose: Dense Human Pose Estimation in The Wild, in The IEEE Conference on Computer Vision and Pattern Recognition (CVPR), 10 pages, Feb. 1, 2018.

Ha, et al., Hypernetworks, ArXiv Preprint Arxiv: 1609.09106V4, 29 pages, Dec. 1, 2016.

Heusel, et al., Gans Trained by a Two Time-Scale Update Rule Converge to a Local Nash Equilibrium, in Advances in neural information processing systems, 12 pages, 2017.

Iandola, et al., Squeezenet: AlexNet-Level Accuracy With 50x Fewer Parameters And < 0.5 MB Model Size, arXiv Preprint arXiv: 1602.07360v4, 13 pages, Nov. 4, 2016.

Ioffe, et al., Batch Normalization: Accelerating Deep Network Training by Reducing Internal Co-Variate Shift, arXiv preprint arXiv: 1502.03167v3, 11 pages, Mar. 2, 2015.

Kingma et al., Adam: A Method for Stochastic Optimization, In ICLR, 13 pages, Apr. 23, 2015.

Li, et al., Multi-Human Parsing in The Wild, arXiv preprint arXiv: 1705.07206v2, 19 pages, Mar. 15, 2018.

Li, et al., Self-Correction for Human Parsing, arXiv: 1910.09777v1, 10 pages, Oct. 22, 2019.

Ma, et al., Pose Guided Person Image Generation, in Neural Information Processing Systems, 11 pages, 2017.

Men, et al., Controllable Person Image Synthesis with Attribute-Decomposed Gan, in Proceedings of the IEEE Conference on Computer Vision and Pattern Recognition, pp. 5084-5093, 2020.

Nair, et al., Rectified Linear Units Improve Restricted Boltzmann Machines, in Proceedings of the 27th international conference on machine learning (ICML), 8 pages, 2010.

Ren, et al., Human motion transfer from poses in the wild, arXiv preprint arXiv:2004.03142v1, 18 pages, Apr. 7, 2020.

Siarohin, et al., First Order Motion Model for Image Animation, in Advances in Neural Information Processing Systems, 11 pages, 2019.

Siarohin, et al., Deformable Gans For Pose-Based Human Image Generation, in Proceedings of the IEEE Conference on Computer Vision and Pattern Recognition, pp. 3408-3416, 2018.

Simonyan, et al., Very Deep Convolutional Networks for Large-Scale Image Recognition, arXiv preprint arXiv: 1409.1556v6, Published as a conference paper at ICLR, 14 pages, Apr. 10, 2015.

Ulyanov, et al., Instance Normalization: The Missing Ingredient for Fast Stylization, arXiv preprint arXiv: 1607.08022v4, 6 pages, Nov. 6, 2017.

Wang, et al., Few-shot Video-to-Video Synthesis, in Advances in Neural Information Processing Systems (NeurIPS), 12 pages, 2019.

Wang, et al., Video-to-Video Synthesis, in Advances in Neural Information Processing Systems (NeurIPS), 13 pages, 2018.

Wang, et al., Image Quality Assessment: From Error Visibility to Structural Similarity, IEEE transactions on image processing, 13(4):1-14, Apr. 4, 2004.

Yang, et al., TransMoMo: Invariance-Driven Unsupervised Video Motion Retargeting, in Computer Vision and Pattern Recognition, 10 pages, 2020.

Yu, et al., Free-Form Image Inpainting with Gated Convolution, arXiv preprint arXiv: 1806.03589v2, 17 pages, Oct. 22, 2019.

Yu, et al., Generative Image Inpainting With Contextual Attention, arXiv preprint arXiv: 1801.07892v2, 15 pages, Mar. 2, 2018.

Zhao, et al., Understanding Humans in Crowded Scenes: Deep Nested Adversarial Learning and A New Benchmark for Multi-Human Parsing, arXiv preprint arXiv: 1804.03287, 14 pages, Jul. 6, 2018.

Zhou, et al., Adaptive Temporal Encoding Network for Video Instance-Level Human Parsing, In Proceedings of the 26th ACM international conference on Multimedia, 9 pages, Aug. 10, 2018.

Balakrishnan G., et al., "Synthesizing Images of Humans in Unseen Poses," Proceedings of the IEEE Conference on Computer Vision and Pattern Recognition, 2018, pp. 8340-8348.

Bulat A., et al., "How Far Are We From Solving the 2D & 3D Face Alignment Problem? (and a dataset of 230,000 3D facial landmarks)," In Proceedings of the IEEE International Conference on Computer Vision, Sep. 7, 2017, pp. 1021-1030.

Deng J., et al., "ImageNet: A Large-Scale Hierarchical Image Database," Department of Computer Science, Princeton University, 2009, 8 Pages.

Esser P., et al., "A Variational U-Net for Conditional Appearance and Shape Generation," Proceedings of the IEEE Conference on Computer Vision and Pattern Recognition, 2018, 10 pages.

Gafni O., et al., "Live Face De-ldentification in Video," In Proceedings of the IEEE/CVF International Conference on Computer Vision, Nov. 19, 2019, 13 pages.

Liu W., et al., "Liquid Warping Gan: A Unified Framework for Human Motion Imitation, Appearance Transfer and Novel View Synthesis," The IEEE International Conference on Computer Vision (ICCV), 2019, 10 pages.

Liu Z., et al., "DeepFashion: Powering Robust Clothes Recognition and Retrieval with Rich Annotations," In Proceedings of IEEE Conference on Computer Vision and Pattern Recognition (CVPR), 2016, 9 pages.

Mao X., et al., "Least Squares Generative Adversarial Networks," International Conference on Computer Vision, 2017, pp. 2794-2802.

Park T., et al., "Semantic Image Synthesis with Spatially-Adaptive Normalization," In Conference on Computer Vision and Pattern Recognition, Mar. 18, 2019, 19 pages.

Pumarola A., et al., "Unsupervised Person Image Synthesis in Arbitrary Poses," The IEEE Conference on Computer Vision and Pattern Recognition (CVPR), 2018, pp. 8620-8628.

Song S., et al., "Unsupervised Person Image Generation with Semantic Parsing Transformation," IEEE Conference on Computer Vision and Pattern Recognition, 2019, 10 pages.

Wang T-C., et al., "High-Resolution Image Synthesis and Semantic Manipulation with Conditional GANs," Proceedings of the IEEE Conference on Computer Vision and Pattern Recognition, 2018, 10 pages.

(56) References Cited

OTHER PUBLICATIONS

Wei L., et al., "Person Transfer GAN to Bridge Domain Gap for Person Re-Identification," Proceedings of the IEEE Conference on Computer Vision and Pattern Recognition, 2018, pp. 79-88.

Zhang R., et al., "The Unreasonable Effectiveness of Deep Features as a Perceptual Metric," In Proceedings of the IEEE Conference on Computer Vision and Pattern Recognition, 2018, 10 pages.

Zheng L., et al., "Scalable Person Re-Identification: A Benchmark," Proceedings of the IEEE International Conference on Computer Vision, 2015, pp. 1116-1124.

Zhou Y., et al., "Dance Dance Generation: Motion Transfer for Internet Videos," International Conference on Computer Vision, Workshops, 2019, 9 pages.

Zhu Z., et al., "Progressive Pose Attention Transfer for Person Image Generation," Proceedings of the IEEE Conference on Computer Vision and Pattern Recognition, 2019, pp. 2347-2356.

* cited by examiner

MOTION TRANSFER USING MACHINE-LEARNING MODELS

TECHNICAL FIELD

This disclosure generally relates to image processing solutions, and in particular, related to creating a first video stream of an animated target person mimicking the motions of a driving person captured in a second video stream.

BACKGROUND

Artificial neural networks (ANNs), usually simply called neural networks (NNs), are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. Generative Adversarial Networks (GANs) are a type of the ANNs that generate new data, such as a new image, based on input data.

SUMMARY OF PARTICULAR EMBODIMENTS

Particular embodiments described herein relate to systems and methods for creating a first video stream of an animated target person mimicking the motions of a driving person captured in a second video stream. A task of motion transfer between a driving person and a target person, in which the target person changes their pose in accordance with the motions of the driving person, may be a special case of the pose transfer problem. The method disclosed herein may generate a sequence of high-resolution realistic frames of the animated target person based on a single image of the target person and an arbitrary video sequence of the driving person. Neither the single image of the target person nor the video sequence of the driving person has been exposed to the used machine-learning models during their trainings. The method disclosed herein may have a number of benefits compared to previous approaches: The target person can vary in body shape, age, ethnicity, gender, pose, and viewpoint. The sequence of poses that form the motion may be unconstrained. The background of the output video stream can vary arbitrarily and is not limited to the source image or the background of the driving video. The facial expression of the target person in the source image may be kept on the animated target person.

In particular embodiments, A computing device may generate a keypoint pose and a dense pose for a first person in a first pose based on a first image comprising the first person in the first pose. In particular embodiments, the first image may correspond to a frame of a video stream capturing the first person moving in a sequence. The keypoint pose may comprise keypoints of the first person in the first pose represented by a stick figure. The keypoint pose may be generated by processing the first image using a pre-trained machine-learning model. In particular embodiments, the pre-trained machine-learning model may be an OpenPose network. The stick figure in the keypoint pose may further comprise facial and hand landmarks. The dense pose may comprise two channels mapping sampling points of the first person's body to UV coordinates and a body index channel, and wherein the dense pose may be generated by processing the first image using a pre-trained machine-learning model. In particular embodiments, the pre-trained machine-learning model may be a DensePose network. The computing device may generate an input semantic segmentation map corresponding to a second person in a second pose based on a second image comprising the second person in the second pose. The computing device may generate a target semantic segmentation map corresponding to the second person in the first pose by processing the keypoint pose, the dense pose, and the input segmentation map using a first machine-learning model. The first machine-learning model may comprise down-sample convolutional blocks, residual blocks, and up-sample convolutional blocks. The computing device may generate an encoding vector representing the second person based on the second image. In order to generate the encoding vector representing the second person, the computing device, at a first step, may generate k sub-images of a pre-determined size based on the second image. Each of the k sub-images may comprise a corresponding body segment of the second person in the second image. The corresponding body segment may be face and hair, upper-body clothing, lower-body clothing, shoes and socks, skin tone, or any suitable body segment. At a second step, the computing device may generate a corresponding encoding sub-vector for each of the k sub-images using a corresponding pre-trained machine-learning model. At a third step the computing device may construct the encoding vector by concatenating k encoding sub-vectors corresponding to the k sub-images. The computing device may generate a target image of the second person in the first pose by processing the encoding vector and the target segmentation map using a second machine-learning model. The second machine-learning model may comprise a fully connected layer and a decoder. The fully connected layer may take the encoding vector as an input. The decoder may comprise a plurality of up-sample layers with interleaving semantic segmentation map input layers. Each of the semantic segmentation map input layer may take the target semantic segmentation map as an input. In particular embodiments, the interleaving semantic segmentation map input layers may be SPADE blocks.

In particular embodiments, the computing device may generate a first face encoding vector corresponding to a face of the second person in the target image by processing a face crop of the second person from the target image with an encoder of a third machine-learning model. The computing device may generate a second face encoding vector representing face features of the second person by processing the second image with a pre-trained machine-learning model. The computing device may generate a temporary image comprising a refined face of the target person by processing the first face encoding vector and the second face encoding vector with a decoder of the third machine-learning model. The decoder of the third machine-learning model may also produce a first blending mask. The first blending mask may represent a blending weight to be applied to the temporary image at each pixel of the output image. The computing device may blend the generated refined face into the target image by multiplying an inverse of the first blending mask to the target image and projecting the temporary image multiplied by the first blending mask to the target image.

In particular embodiments, the second machine-learning model may also produce a second blending mask. The second blending mask may indicates an area in an output image that is to be filled by the second person in the target image. The computing device may generate the output image by compositing a background image multiplied by an inverse of the second blending mask and the target image multiplied by the second blending mask.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
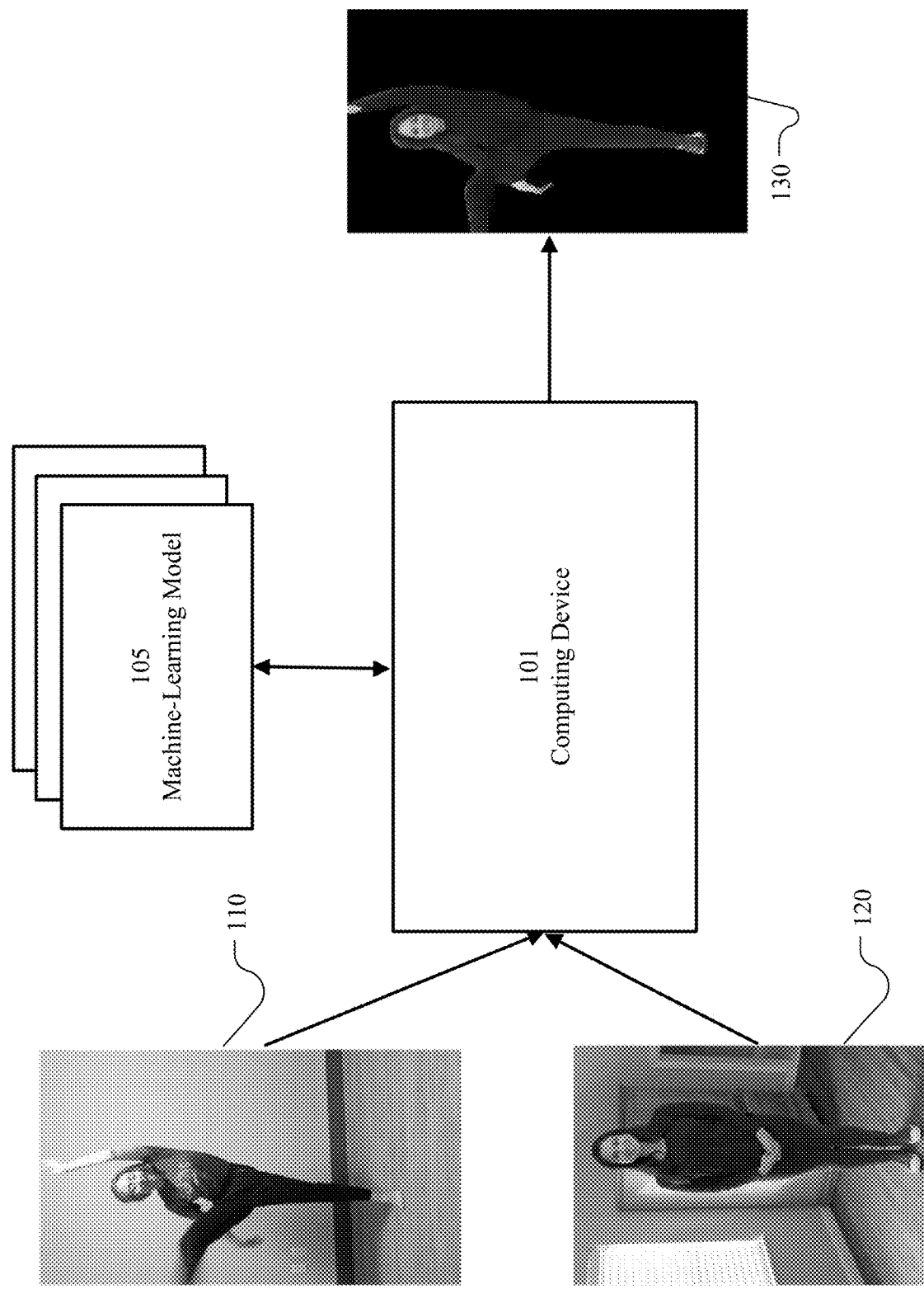
FIG. 1 illustrates an example architecture for generating an output image of a target person having a pose of a driving person captured in an image.

FIG. 1 illustrates an example architecture for generating an output image of a target person having a pose of a driving person captured in a first image. The first image may correspond to a frame of a video stream capturing the first person moving in a sequence. A task of motion transfer between the driving person and the target person, in which the target person changes their pose in accordance with the motions of the driving person, may be a special case of the pose transfer problem. A computing device 101 may generate a high-resolution realistic output image 130 of the animated target person based on the first image 110 of the driving person in a first pose and a second image 120 of the target person. The computing device 101 may utilize one or more machine-learning models 105 for each step of the procedure. Some of the utilized machine-learning models 105 may be generative adversarial networks (GAN). When the first image corresponds to a frame of a driving video stream, the computing device 101 may generate a sequence of frames of the animated target person by generating an output image of the target person having a corresponding pose of the driving person captured in each frame of the driving video stream. Neither the second image 120 of the target person nor any frame of the driving video stream has been exposed to any of the used machine-learning models 105 during their trainings. The method disclosed herein may have a number of benefits compared to previous approaches: The target person can vary in body shape, age, ethnicity, gender, pose, and viewpoint. The sequence of poses that form the motion may be unconstrained. The background of the output image 130 can vary arbitrarily and is not limited to the first image 110 or the second image 120. The facial expression of the target person in the second image 120 may be kept on the animated target person. Although this disclosure describes a particular architecture for generating an output image of a target person having a pose of a driving person, this disclosure contemplates any suitable architecture for generating an output image of a target person having a pose of a driving person.

In particular embodiments, A computing device 101 may generate a keypoint pose and a dense pose for a first person in a first pose based on a first image 110 comprising the first person in the first pose. In particular embodiments, the first image 110 may correspond to a frame of a video stream capturing the first person moving in a sequence. The keypoint pose may comprise keypoints of the first person in the first pose represented by a stick figure. The keypoint pose may be generated by processing the first image 110 using a pre-trained machine-learning model. In particular embodiments, the pre-trained machine-learning model may be an OpenPose network. The stick figure in the keypoint pose may further comprise facial and hand landmarks. The dense pose may comprise two channels mapping sampling points of the first person's body to UV coordinates and a body index channel, and wherein the dense pose may be generated by processing the first image 110 using a pre-trained machine-learning model. In particular embodiments, the pre-trained machine-learning model may be a DensePose network. The computing device 101 may generate an input semantic segmentation map corresponding to a second person in a second pose based on a second image 120 comprising the second person in the second pose. The computing device 101 may generate a target semantic segmentation map corresponding to the second person in the first pose by processing the keypoint pose, the dense pose, and the input segmentation map using a first machine-learning model. The first machine-learning model may comprise down-sample convolutional blocks, residual blocks, and up-sample convolutional blocks. The computing device 101 may generate an encoding vector representing the second person based on the second image 120. In order to generate the encoding vector representing the second person, the computing device 101, at a first step, may generate k sub-images of a pre-determined size based on the second image 120. Each of the k sub-images may comprise a corresponding body segment of the second person in the second image 120. The corresponding body segment may be face and hair, upper-body clothing, lower-body clothing, shoes and socks, skin tone, or any suitable body segment. At a second step, the computing device 101 may generate a corresponding encoding sub-vector for each of the k sub-images using a corresponding pre-trained machine-learning model. At a third step the computing device 101 may construct the encoding vector by concatenating k encoding sub-vectors corresponding to the k sub-images. The computing device 101 may generate a target image of the second person in the first pose by processing the encoding vector and the target segmentation map using a second machine-learning model. The second machine-learning model may comprise a fully connected layer and a decoder. The fully connected layer may take the encoding vector as an input. The decoder may comprise a plurality of up-sample layers with interleaving semantic segmentation map input layers. Each of the semantic segmentation map input layer may take the target semantic segmentation map as an input. In particular embodiments, the interleaving semantic segmentation map input layers may be SPADE blocks. Although this disclosure describes generating a target image of a target person having a pose of a driving person in a particular manner, this disclosure contemplates generating a target image of a target person having a pose of a driving person in any suitable manner.

In particular embodiments, the computing device 101 may access a first image 110 comprising a first person in a first pose. In particular embodiments, the first image 110 may correspond to a frame of a video stream capturing the first person moving in a sequence. As an example and not by way of limitation, the computing device 101 may access a frame of a first video stream capturing a dancer's dancing movements. At each frame of the first video stream, the dancer may be in a particular pose as a result of the dance movements. Although this disclosure describes accessing an image of a driving person in a first pose in a particular manner, this disclosure contemplates accessing an image of a driving person in a first pose in any suitable manner.

In particular embodiments, the computing device 101 may access a second image 120 comprising a second person in a second pose. The second person may be a target person who will be animated to have the first pose in a generated target image. As an example and not by way of limitation, continuing with a prior example, the computing device 101 may access an image of a target person. The computing device 101 may generate a target image 130 comprising an animated target person having the first pose of the dancer in the first image 110 by performing a series of procedures. The computing device 101 may be able to generate a second video sequence of the target person performing the dancing movements of the dancer captured in the first video stream by generating a target image for each frame of the first video stream. Although this disclosure describes accessing an image of a target person in a second pose in a particular manner, this disclosure contemplates accessing an image of a target person in a second pose in any suitable manner.

Figure 2:
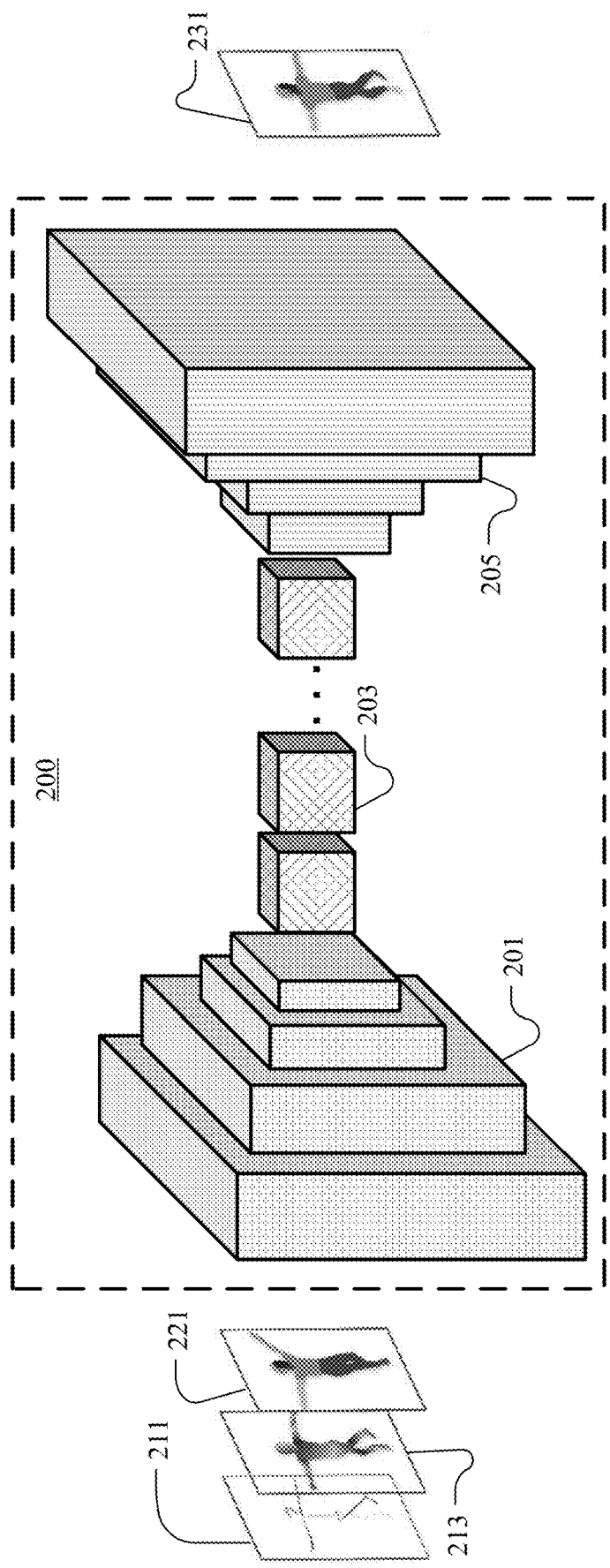
FIG. 2 illustrates an example architecture for a Pose-to-Body network.

FIG. 2 illustrates an example architecture for a Pose-to-Body network. The Pose-to-Body network 200 may take the followings as input: a keypoint pose 211 and a dense pose 213 of the first person in the first pose captured in the first image 110, and an input semantic segmentation map 221 corresponding to the second person in the second pose captured in the second image 120. The Pose-to-Body network 200 may generate a target semantic segmentation map 231 corresponding to the second person in the first pose. Although this disclosure describes a particular machine-learning model architecture for generating a target semantic segmentation map, this disclosure contemplates any suitable machine-learning model architecture for generating a target semantic segmentation map.

In particular embodiments, a computing device 101 may generate a keypoint pose 211 for the first person in the first pose based on the accessed first image 110. In particular embodiments, the keypoint pose 211 may comprise keypoints of the first person in the first pose represented by a stick figure. The stick figure may be a single red, green, and blue (RGB) image. The keypoint pose 211 may be generated by processing the first image 110 using a pre-trained machine-learning model. In particular embodiments, the pre-trained machine-learning model may be an OpenPose network. The stick figure in the keypoint pose 211 may further comprise facial and hand landmarks increasing certainty and stability to the generated output. Although this disclosure describes generating a keypoint pose for a person in a pose in a particular manner, this disclosure contemplates generating a keypoint pose for a person in a pose in any suitable manner.

In particular embodiments, a computing device 101 may generate a dense pose 213 for the first person in the first pose based on the accessed first image 110. In particular embodiments, the dense pose 213 may comprise three channels: two channels mapping sampling points of the first person's body to UV coordinates and a body index channel. The dense pose 213 may be generated by processing the first image 110 using a pre-trained machine-learning model. In particular embodiments, the pre-trained machine-learning model may be a DensePose network. Although this disclosure describes generating a dense pose for a person in a pose in a particular manner, this disclosure contemplates generating a dense pose for a person in a pose in any suitable manner.

In particular embodiments, the computing device 101 may generate an input semantic segmentation map 221 corresponding to a second person in a second pose based on a second image 120 comprising the second person in the second pose. The computing device 101 may process the second image 120 with a pre-trained human parser network to generate the input semantic segmentation map 221. The pre-trained human parser network may generate a semantic segmentation map by processing an input image. The generated semantic segmentation map may comprise n labels, where each label may indicate a corresponding body part. When a pixel of the input image corresponds to a particular body part, the pixel in the generated semantic segmentation map may have a label corresponding to the particular body part as a value. The input semantic segmentation map 221 may comprise two additional labels to augment the hand landmarks extracted by the OpenPose network. Although this disclosure describes generating a semantic segmentation map based on an image in a particular manner, this disclosure contemplates generating a semantic segmentation map based on an image in any suitable manner.

In particular embodiments, the computing device 101 may generate a target semantic segmentation map 231 corresponding to the second person in the first pose by processing the keypoint pose 211, the dense pose 213, and the input segmentation map 221 using the Pose-to-Body network 200. The Pose-to-Body network 200 may comprise down-sample convolutional blocks 201, residual blocks 203, and up-sample convolutional blocks 205. Three inputs (the keypoint pose 211, the dense pose 213, and the input segmentation map 221) of the same spatial dimension may be concatenated to one input tensor. The down-sample convolutional blocks 201 may be an encoder part of the network. The down-sample convolutional blocks 201 may be associated with Rectified Linear Unit (ReLU) activations and batch normalization. A latent space embedding generated by the encoder part of the network may go through a number of residual blocks 203. Finally, the up-sample convolutional blocks 205, the decoder part, may employ fractional strided convolutions, ReLU activations, and instance normalization. A sigmoid non-linearity is applied after the last convolution to generate the target semantic segmentation map 231. Although this disclosure describes generating a target semantic segmentation map using a machine-learning model in a particular manner, this disclosure contemplates generating a target semantic segmentation map using a machine-learning model in any suitable manner.

Figure 3:
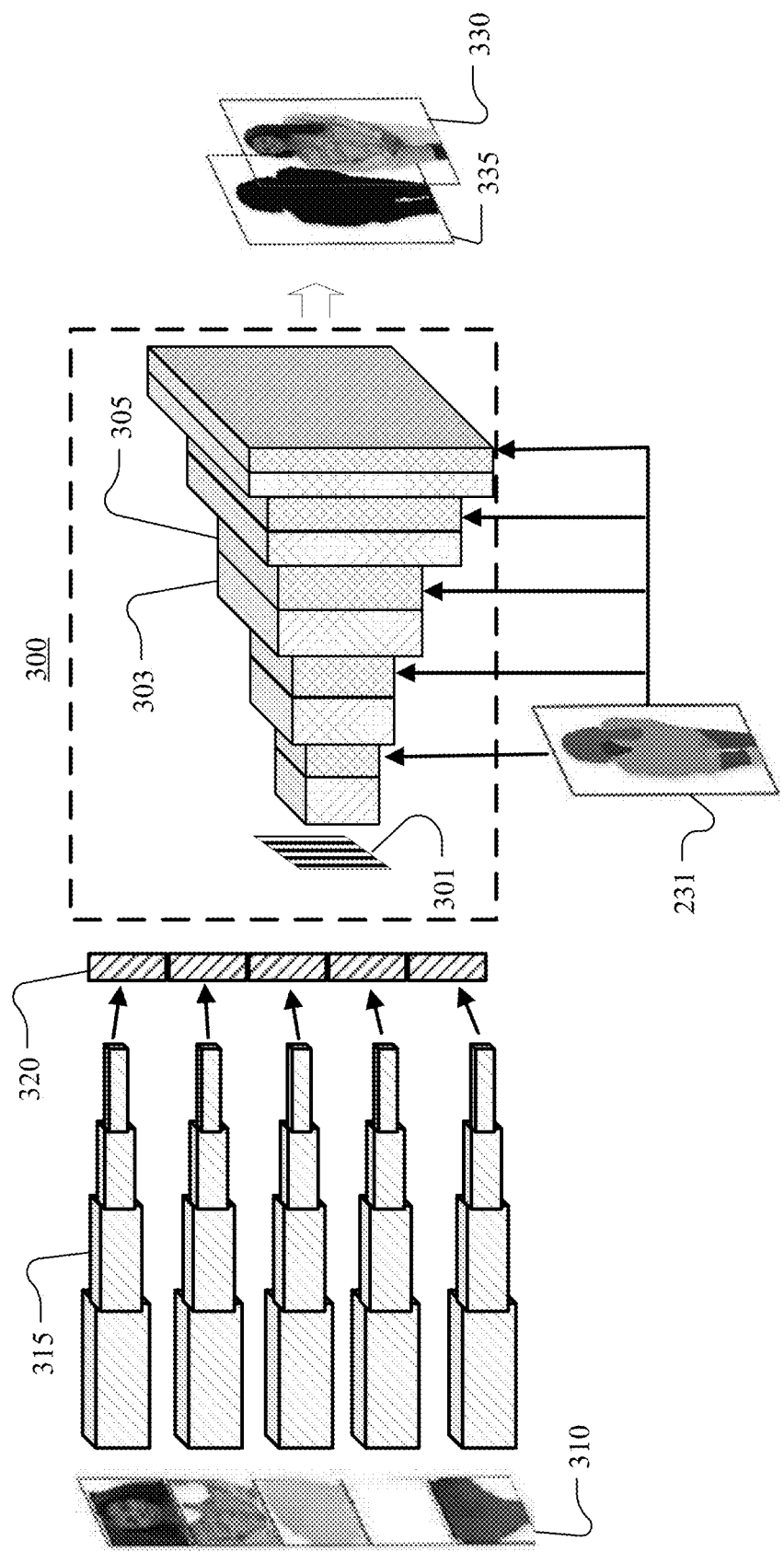
FIG. 3 illustrates an example architecture for a Body-to-Frame network.

FIG. 3 illustrates an example architecture for a Body-to-Frame network. The Body-to-Frame network 300 may take an encoding vector 320 representing the second person based on the second image 120 and the target semantic segmentation map 231 generated by the Pose-to-Body network 200 as input. The Body-to-Frame network 300 may generate a target image 330 of the second person in the first pose. The first pose may be the pose of the first person in the first image 110. The Body-to-Frame network 300 may also generate a blending mask 335 indicating an area in an output image that is to be filled by the second person in the target image. Although this disclosure describes a particular machine-learning model architecture for generating a target image of an animated person having a pose of another person in an image, this disclosure contemplates any suitable machine-learning model architecture for generating a target image of an animated person having a pose of another person in an image.

In particular embodiments, the computing device 101 may generate an encoding vector 320 representing the second person based on the second image 120. In order to generate the encoding vector 320 representing the second person, the computing device 101, at a first step, may generate k sub-images 310 of a pre-determined size based on the second image 120 and the input semantic segmentation map 221 of the second person in the second pose. The input semantic segmentation map 221 may also be generated based on the second image 120. Each of the k sub-images 310 may comprise a corresponding body segment of the second person in the second image 120. The corresponding body segment may be face and hair, upper-body clothing, lower-body clothing, shoes and socks, skin tone, or any suitable body segment. Each of the k sub-images 310 may be created corresponding to the resized bounding boxes around k semantic segments: At a second step, the computing device 101 may generate a corresponding encoding sub-vector for each of the k sub-images 310 using a corresponding pre-trained machine-learning model 315. As an example and not by way of limitation, the computing device 101 may generate an encoding sub-vector for a sub-image 310 corresponding to face and hair by processing the sub-image 310 corresponding to face and hair with a pre-trained face encoding network. At a third step the computing device 101 may construct the encoding vector 320 by concatenating k encoding sub-vectors corresponding to the k sub-images. Although this disclosure describes generating an encoding vector representing a person based on an image of the person in a particular manner, this disclosure contemplates generating an encoding vector representing a person based on an image of the person in any suitable manner.

In particular embodiments, the computing device 101 may generate a target image 330 of the second person in the first pose by processing the encoding vector 320 and the target semantic segmentation map 231 using the Body-to-Frame network 300. The Body-to-Frame network 300 may comprise a fully connected layer 301 and a decoder. The fully connected layer 301 may take the encoding vector 320 as an input. The fully connected layer 301 may produce a vector that is to be reshaped into a three-dimensional tensor. The decoder may comprise a plurality of up-sample layers 303 with interleaving semantic segmentation map input layers 305. Each of the semantic segmentation map input layer 305 may take the target semantic segmentation map 231 as an input. In particular embodiments, the interleaving semantic segmentation map input layers 305 may be SPADE blocks. Although this disclosure describes generating an image of an animated person having a pose based on an encoding vector representing the person and a semantic segmentation map representing the pose using a machine-learning model in a particular manner, this disclosure contemplates generating an image of an animated person having a pose based on an encoding vector representing the person and a semantic segmentation map representing the pose using a machine-learning model in any suitable manner.

Figure 4:
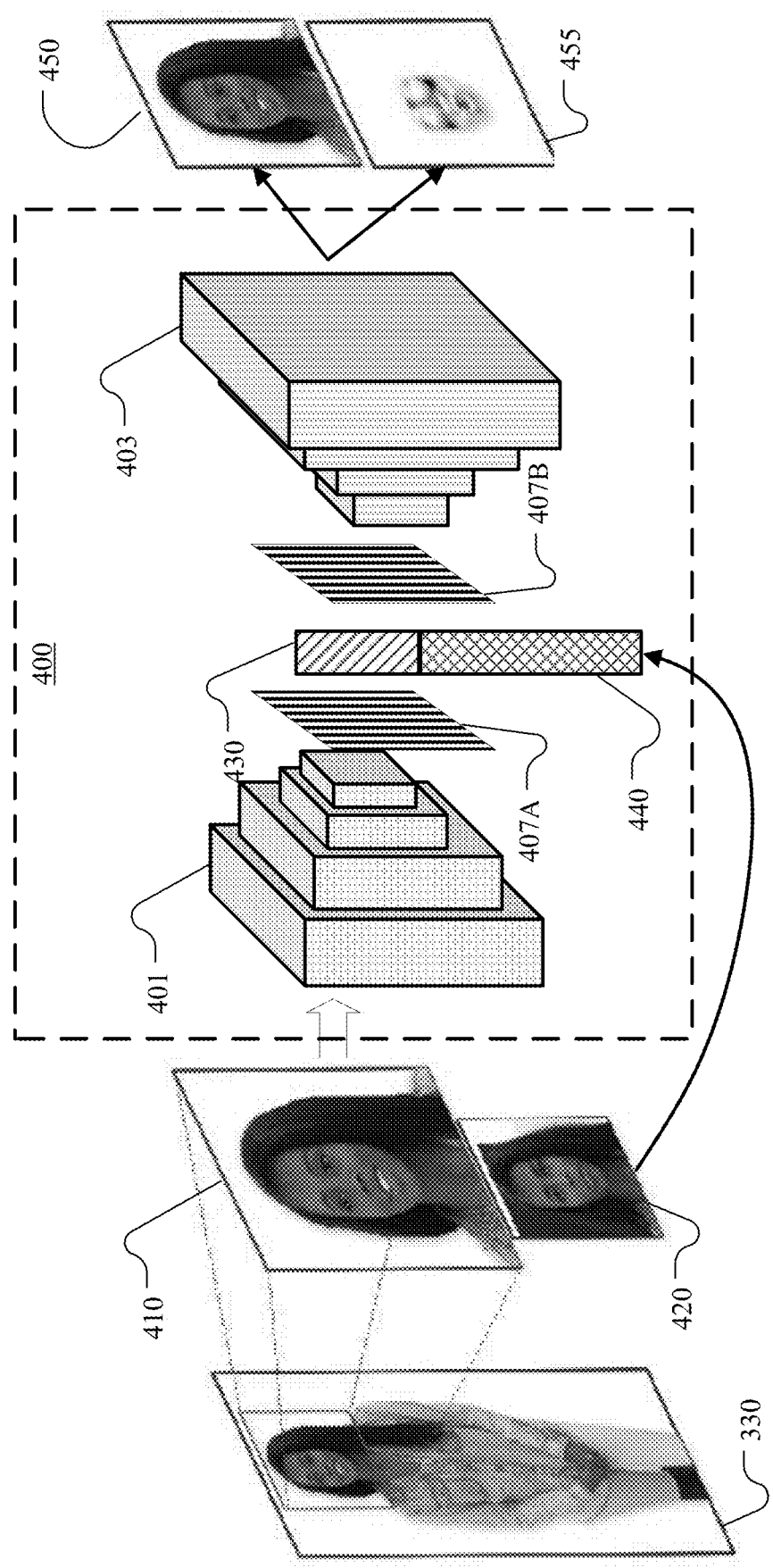
FIG. 4 illustrates an example architecture for a Face Refinement network.

FIG. 4 illustrates an example architecture for a Face Refinement network. The Face Refinement network 400 may take a face crop 410 of the second person in the target person and an encoding vector 440 representing face features of the second person as input. The Face Refinement network 400 may generate a temporary image 450 comprising a refined face of the second person and a blending mask 455. The blending mask 455 may represent a blending weight to be applied to the temporary image 450 at each pixel of the target image. Although this disclosure describes a particular machine-learning model architecture for generating an image of refined face of a person, this disclosure contemplates any suitable machine-learning model architecture for generating an image of refined face of a person.

In particular embodiments, the computing device 101 may refine the face of the second person in the target image 330. The computing device 101 may generate a first face encoding vector 430 corresponding to a face of the second person in the target image 330 by processing a face crop 410 of the second person from the target image 330 with an encoder of the Face Refinement network 400. The encoder of the Face Refinement network 400 may comprise down-sample convolution blocks 401 and a fully connected layer 407A. The computing device 101 may generate a second face encoding vector 440 representing face features of the second person by processing a face crop 420 of the second person in the second image 120 with a pre-trained machine-learning model. The computing device 101 may generate a temporary image 450 comprising a refined face of the second person by processing the first face encoding vector and the second face encoding vector with a decoder of the Face Refinement network 400. The decoder of the Face Refinement network 400 may comprise a fully connected layer 407B and up-sample convolution blocks 403. The decoder of the Face Refinement network 400 may also produce a first blending mask 455. The first blending mask 455 may represent a blending weight to be applied to the temporary image 450 at each pixel of the target image 330. The computing device 101 may blend the generated refined face into the target image 330 by multiplying an inverse of the first blending mask 455 to the target image 330 and projecting the temporary image 450 multiplied by the first blending mask 455 to the target image 330. Although this disclosure describes refining the face of an animated person in a generated image using a machine-learning model in a particular manner, this disclosure contemplates refining the face of an animated person in a generated image using a machine-learning model in any suitable manner.

Figure 5:
FIG. 5 illustrates example output images with various backgrounds.

In particular embodiments, the Body-to-Frame network 300 may also produce a blending mask 335. The blending mask 335 may indicate an area in an output image that is to be filled by the second person in the target image 330. The computing device 101 may generate an output image by compositing a background image multiplied by an inverse of the blending mask 335 and the target image 330 multiplied by the blending mask 335. With the blending mask 335, the computing device 101 may be able to generate an output image of any background without introducing artifacts. FIG. 5 illustrates example output images with various backgrounds. Although this disclosure describes blending an animated person in a generated image with a background in a particular manner, this disclosure contemplates blending an animated person in a generated image with a background in any suitable manner.

In particular embodiments, the Pose-to-Body network 200 may be trained using training data. For each iteration of training the Pose-to-Body network 200, two images of a single person in two different poses may be used. Two frames of a video stream capturing a person's movement may be randomly selected for the training data for an iteration of the training. In particular embodiments, the two selected frames may be within a pre-determined number of frames. An iteration of training the Pose-to-Body network 200 may comprise a number of steps as followings: At a first step, a computing device 101 may generate a training keypoint pose and a training dense pose for a third person in a third pose based on a third image comprising the third person in the third pose. At a second step, the computing device 101 may generate a training input semantic segmentation map corresponding to the third person in a fourth pose based on a fourth image comprising the third person in the fourth pose. In particular embodiments, the third image and the fourth image may be randomly selected from a video stream capturing the third person's movements. At a third step, the computing device 101 may generate a training target semantic segmentation map corresponding to the third person in the third pose by processing the training keypoint pose, the training dense pose, and the training input segmentation map using the Pose-to-Body network 200. At a fourth step, the computing device 101 may compute gradients for variables of the Pose-to-Body network 200 by comparing the created training target semantic segmentation map with a ground truth semantic segmentation map generated based on the third image. At a fifth step, the computing device 101 may update the variables of the first machine-learning mode based on the computed gradients. Although this disclosure describes training the Pose-to-Body network in a particular manner, this disclosure contemplates training the Pose-to-Body network in any suitable manner.

In particular embodiments, the computing device 101 may augment the training input semantic segmentation map and the ground truth semantic segmentation map in a random, but synchronized manner. The augmentation may comprise squeezing and stretching. Because two images for a single person are used as training data for an iteration of the training, the Pose-to-Body network tends to learn a transformation of a source body structure, through the training keypoint pose or the training dense pose representations, to the generated body structure. In order to create a mismatch between the poses and semantic maps, the computing device may squeeze and/or stretch the input semantic segmentation map and the ground truth semantic segmentation map while not augmenting the training keypoint pose and the training dense pose. The computing device 101 may randomly determine augmentation effects and apply the determined augmentation effects to both the training input semantic segmentation map and the ground truth semantic segmentation map. Although this disclosure describes augmenting the training input semantic segmentation map and the ground truth semantic segmentation map in a particular manner, this disclosure contemplates augmenting the training input semantic segmentation map and the ground truth semantic segmentation map in any suitable manner.

Figure 6:
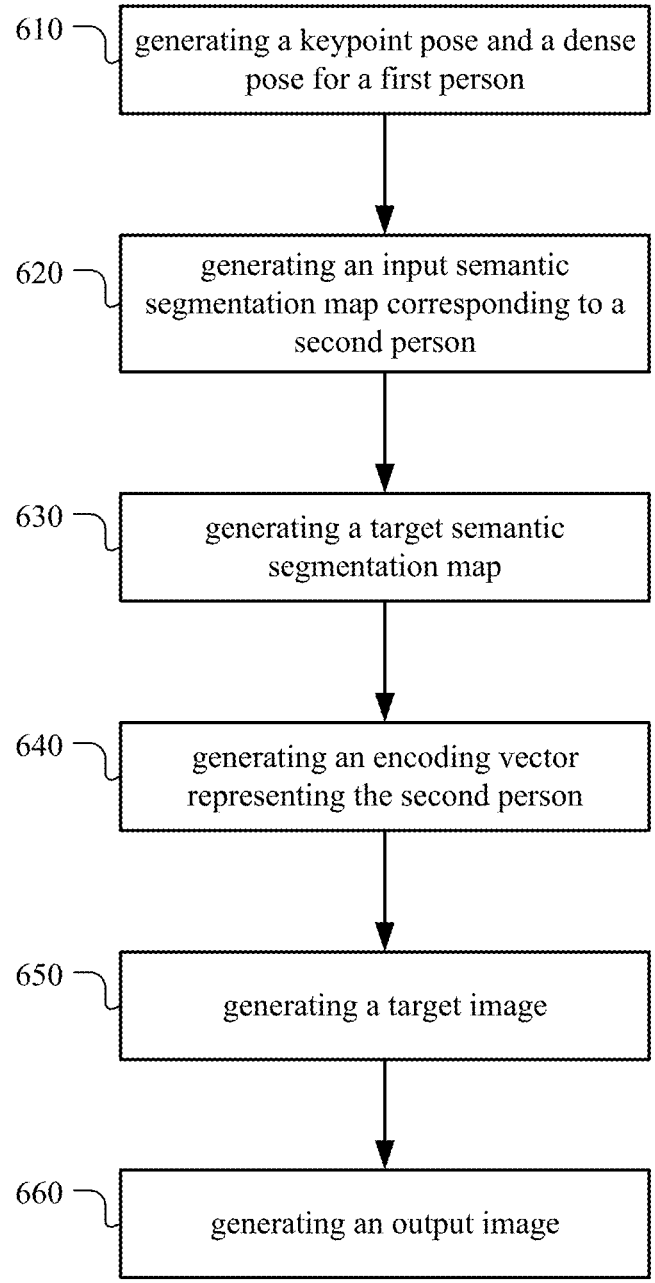
FIG. 6 illustrates an example method for generating an output image of a target person having a pose of a driving person captured in an image.

FIG. 6 illustrates an example method 600 for generating an output image of a target person having a pose of a driving person captured in an image. The method may begin at step 610, where the computing device 101 may generate a keypoint pose and a dense pose for a first person in a first pose based on a first image comprising the first person in the first pose. At step 620, the computing device 101 may generate an input semantic segmentation map corresponding to a second person in a second pose based on a second image comprising the second person in the second pose. At step 630, the computing device 101 may generate a target semantic segmentation map corresponding to the second person in the first pose by processing the keypoint pose, the dense pose, and the input segmentation map using a first machine-learning model. At step 640, the computing device 101 may generate an encoding vector representing the second person based on the second image. At step 650, the computing device 101 may generate a target image of the second person in the first pose by processing the encoding vector and the target segmentation map using a second machine-learning model. At step 660, the computing device 101 may generate an output image of the second person in the first pose by refining the face of the second person in the target image and by blending the target image of the second person in the first pose with a selected background image. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating an output image of a target person having a pose of a driving person captured in an image including the particular steps of the method of FIG. 6, this disclosure contemplates any suitable method for generating an output image of a target person having a pose of a driving person captured in an image including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

More information on the systems and methods disclosed herein may be found in Oran Gafni, Oron Ashual, and Lior Wolf, "Single-Shot Freestyle Dance Reenactment," https://arxiv.org/abs/2012.01158, which is incorporated by reference.

Systems and Methods

Figure 7:
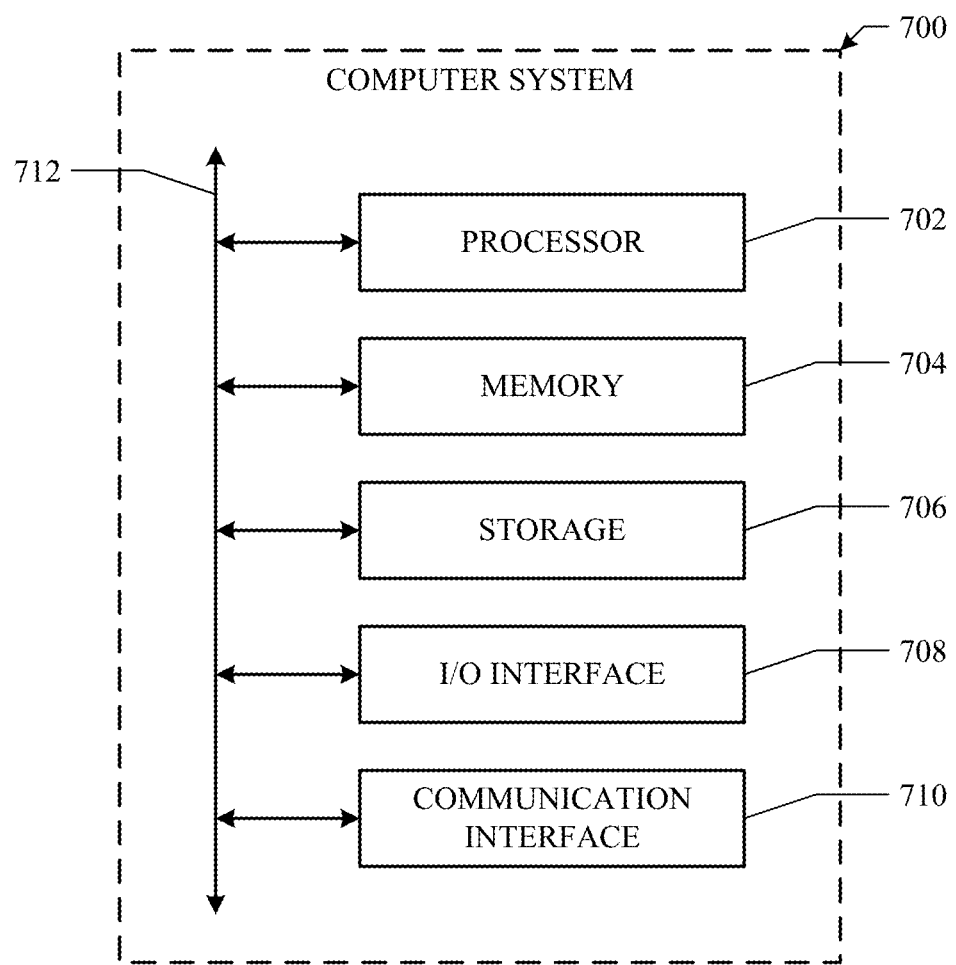
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
generating a keypoint pose and a dense pose for a first person in a first pose based on a first image comprising the first person in the first pose;
generating an input semantic segmentation map corresponding to a second person in a second pose based on a second image comprising the second person in the second pose;
generating a target semantic segmentation map corresponding to the second person in the first pose by processing the keypoint pose, the dense pose, and the input segmentation map using a first machine-learning model;
generating, based on the second image, an encoding vector representing the second person;
generating a target image of the second person in the first pose and a first blending mask corresponding to the second person in the first pose by processing the encoding vector and the target segmentation map using a second machine-learning model; and
generating an output image by using the first blending mask to blend the target image of the second person in the first pose over a background image.

2. The method of claim 1, wherein the first image corresponds to a frame of a video stream capturing the first person moving in a sequence.

3. The method of claim 1, wherein the keypoint pose comprises keypoints of the first person in the first pose represented by a stick figure, wherein the keypoint pose is generated by processing the first image using a pre-trained machine-learning model, and wherein the stick figure in the keypoint pose further comprises facial and hand landmarks.

4. The method of claim 3, wherein the pre-trained machine-learning model is an OpenPose network.

5. The method of claim 1, wherein the dense pose comprises two channels mapping sampling points of the first person's body to UV coordinates and a body index channel, and wherein the dense pose is generated by processing the first image using a pre-trained machine-learning model.

6. The method of claim 5, wherein the pre-trained machine-learning model is a DensePose network.

7. The method of claim 1, wherein the first machine-learning model comprises down-sample convolutional blocks, residual blocks, and up-sample convolutional blocks.

8. The method of claim 1, wherein an iteration of training the first machine-learning model comprises:
generating a training keypoint pose and a training dense pose for a third person in a third pose based on a third image comprising the third person in the third pose;
generating a training input semantic segmentation map corresponding to the third person in a fourth pose based on a fourth image comprising the third person in the fourth pose;
generating a training target semantic segmentation map corresponding to the third person in the third pose by processing the training keypoint pose, the training dense pose, and the training input segmentation map using the first machine-learning model;
computing gradients for variables of the first machine-learning model by comparing the created training target semantic segmentation map with a ground truth semantic segmentation map generated based on the third image; and
updating the variables of the first machine-learning mode based on the computed gradients.

9. The method of claim 8, wherein the training input semantic segmentation map and the ground truth semantic segmentation map are augmented in a random, but synchronized manner such that randomly-determined identical augmentation effects are applied to the training input semantic segmentation map and the ground truth semantic segmentation map.

10. The method of claim 1, wherein generating the encoding vector representing the second person comprises:
generating, based on the second image, k sub-images of a pre-determined size, each of the k sub-images comprising a corresponding body segment of the second person in the second image;
generating, for each of the k sub-images, a corresponding encoding sub-vector using a corresponding pre-trained machine-learning model; and
constructing the encoding vector by concatenating k encoding sub-vectors corresponding to the k sub-images.

11. The method of claim 10, wherein the corresponding body segment is face and hair, upper-body clothing, lower-body clothing, shoes and socks, or skin tone.

12. The method of claim 1, wherein the second machine-learning model comprises a fully connected layer and a decoder, wherein the fully connected layer takes the encoding vector as an input, wherein the decoder comprises a plurality of up-sample layers with interleaving semantic segmentation map input layers, and wherein each of the semantic segmentation map input layer takes the target semantic segmentation map as an input.

13. The method of claim 12, wherein the interleaving semantic segmentation map input layers are SPADE blocks.

14. The method of claim 1, wherein generating the output image comprising compositing the background image multiplied by an inverse of the first blending mask and the target image multiplied by the first blending mask.

15. The method of claim 1, further comprising:
generating a first face encoding vector corresponding to a face of the second person in the target image by processing a face crop of the second person from the target image with an encoder of a third machine-learning model;
generating a second face encoding vector representing face features of the second person by processing the second image with a pre-trained machine-learning model;
generating a temporary image comprising a refined face of the target person by processing the first face encoding vector and the second face encoding vector with a decoder of the third machine-learning model; and
blending the generated refined face into the target image.

16. The method of claim 15, wherein the decoder of the third machine-learning model also produces a second blending mask, wherein the second blending mask represents a blending weight to be applied to the temporary image at each pixel of the target image.

17. The method of claim 16, wherein blending the generated refined face into the target image comprises:
multiplying an inverse of the second blending mask to the target image; and
projecting the temporary image multiplied by the second blending mask to the target image.

18. One or more computer-readable non-transitory storage media embodying software that is operable when executed to:

generate a keypoint pose and a dense pose for a first person in a first pose based on a first image comprising the first person in the first pose;

generate an input semantic segmentation map corresponding to a second person in a second pose based on a second image comprising the second person in the second pose;

generate a target semantic segmentation map corresponding to the second person in the first pose by processing the keypoint pose, the dense pose, and the input segmentation map using a first machine-learning model;

generate, based on the second image, an encoding vector representing the second person;

generate a target image of the second person in the first pose and a first blending mask corresponding to the second person in the first pose by processing the encoding vector and the target segmentation map using a second machine-learning model, and generate an output image by using the first blending mask to blend the target image of the second person in the first pose over a background image.

19. A system comprising: one or more processors; and a non-transitory memory coupled to the processors comprising instructions executable by the processors, the processors operable when executing the instructions to:

generate a keypoint pose and a dense pose for a first person in a first pose based on a first image comprising the first person in the first pose;

generate an input semantic segmentation map corresponding to a second person in a second pose based on a second image comprising the second person in the second pose;

generate a target semantic segmentation map corresponding to the second person in the first pose by processing the keypoint pose, the dense pose, and the input segmentation map using a first machine-learning model;

generate, based on the second image, an encoding vector representing the second person;

generate a target image of the second person in the first pose and a first blending mask corresponding to the second person in the first pose by processing the encoding vector and the target segmentation map using a second machine-learning model, and generate an output image by using the first blending mask to blend the target image of the second person in the first pose over a background image.

\* \* \* \* \*